Oct. 30, 1956     P. G. HANSEL     2,769,091
FREQUENCY DETERMINING APPARATUS
Filed Sept. 9, 1953
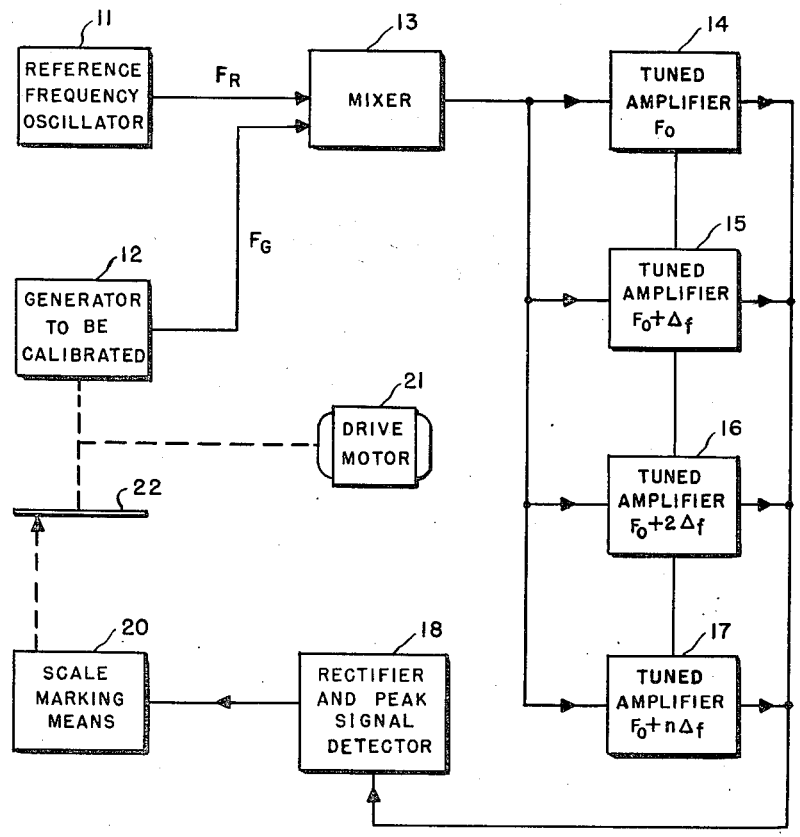
INVENTOR.
PAUL G. HANSEL
BY
*Harry M. Saragovitz*
ATTORNEY

2,769,091

FREQUENCY DETERMINING APPARATUS

Paul G. Hansel, Greenvale, N. Y., assignor to the United States of America as represented by the Secretary of the Army Application September 9, 1953, Serial No. 379,319

3 Claims. (Cl. 250—36)

This invention relates to a frequency determining apparatus, and more particularly to an apparatus for calibrating a source of variable frequency waves.

It is an object of this invention to provide a novel and improved apparatus for determining spaced frequency points in an electric wave swept through a frequency band.

It is a further object of this invention to provide a novel apparatus for quickly and accurately calibrating a source of electric signals variable over a band of frequencies.

In accordance with the invention, the generator to be calibrated is swept through a frequency band and a device on which to record the calibration of the generator is driven in synchronism with the sweeping of the generator. The wave output of the generator is beat against a constant reference frequency wave and the resultant beat frequency wave supplied to a plurality of tuned amplifiers connected in parallel. Each of the amplifiers is tuned to a different frequency in the band swept by the beat frequency wave. The output of each amplifier is detected and caused to produce a calibrating signal which is marked on the recording device.

The features of my invention, which I believe to be novel are set forth with particularity in the appended claims. My invention itself, however, both as to its organization and method of operation, together with further objects and advantages thereof, may best be understood by reference to the following description taken in conjunction with the accompanying drawing which is a block diagram of the invention.

Referring now to the drawing, there is shown a fixed frequency oscillator 11 having an output frequency $F_R$. This frequency should be as stable as possible, and any known means, such as a crystal, may be used to stabilize the frequency of oscillator 11. Block 12 is the tunable generator to be calibrated. The tuning means thereof and dial 22 attached thereto are driven by a motor 21, which causes the output frequency $F_G$ thereof to be varied over the frequency band to be calibrated. The outputs of the generator 12 and oscillator 11 are heterodyned in mixer 13 to produce a beat frequency wave. Tuned filters, such as amplifiers 14, 15, 16 and 17, are tuned to successively higher frequencies in the band swept by the beat frequency wave, amplifiers 14—17 respectively being tuned to frequencies $F_0$, $F_0+\Delta f$, etc. Only 4 amplifiers are shown but it is understood that more or less than four units may be employed according to the requirements of the system. The outputs of the amplifiers are fed to a rectifier and peak detector 18 which successively derives signals from said amplifiers when the beat frequency wave sweeps through the frequencies to which they are tuned. The output of rectifier and peak detector 18 energizes scale marking means 20 and causes it to apply a calibrating mark to the dial 22.

Scale marking means 20 may consist of a source of illumination and a lens system for causing a flash of light or a number to be focused on the dial each time 20 is actuated. In such case the dial would consist of a photographic film. Alternatively, the scale marking means may be a direct writing instrument for placing a pencil mark on a paper dial, or a means for denting or scratching a metal dial, or any other similar mechanical, electrical or optical device for placing an indication on a dial in response to an actuating signal.

In operation, if it is desired to calibrate a signal generator having a range of say 500 to 1600 kilocycles at intervals of 100 kilocycles, it is necessary to have six tuned amplifier stages. In such case, the fixed frequency oscillator 11 is tuned to a frequency of 1050 kilocycles (the center of the band), $F_0$ equals 50 kilocycles, and $\Delta f$ equals 100 kilocycles. When $F_G$ is equal to 1000 kilocycles, the beat note $F_R-F_G$ is 50 kilocycles and the first tuned amplifier 14 passes a signal. Similarly, when $F_G$ equals 1100 kilocycles, the beat note $F_G-F_R$ is 50 kilocycles, and the first tuned amplifier 14 again passes a signal. As $F_G$ departs further from $F_R$, signals pass successively through amplifiers 15, 16, etc., at intervals of 100 kilocycles. These pass through block 18 and cause block 20 to apply calibrating marks to dial 20 at 100 kilocycle intervals.

Although tuned filters 14–17 are described as being tuned to frequencies differing by a constant amount, $\Delta f$ it is understood that they may be tuned to frequencies differing by different amounts, if it is desired to calibrate a scale in a non-uniform manner.

An advantage of this system is that for a given number of tuned filters or amplifiers, twice as many calibrating marks are obtained. This is because the single frequency crystal oscillator is at or near the center frequency of the band swept by the generator to be calibrated so that each tuned amplifier passes a first note at frequency $F_R-F_G$ and a second note at frequency $F_{G_1}-F_R$, where $F_R-F_G=F_{G_1}-F_R=F_0+n\Delta f$, $n$ being an integer equal to 0, 1, 2, etc., $F_G$ being a frequency lower than $F_R$, and $F_{G_1}$ being a frequency higher than $F_R$.

Another advantage of this system is that the band width covered by the tuned amplifier stages need by only one half the band width swept by the generator to be calibrated.

Still another advantage of this system is the basic simplicity of the components and the freedom from troublesome spurious responses.

While there has been described what is at present considered a preferred embodiment of the invention, it will be obvious to those skilled in the art that various changes and modifications may be made therein without departing from the invention and it is aimed in the appended claims to cover all such changes and modifications as fall within the true spirit and scope of the invention.

I claim:

1. Apparatus for calibrating the tuning means of a source of electric signals, comprising means supplying signals of a constant reference frequency, means for sweeping the frequency of said source through a band extending on either side of said reference frequency, means for heterodyning said reference frequency signals with said electric signals to obtain beat frequency signals swept through a band, a plurality of amplifier means connected in parallel with the output of said heterodyning means, each of said amplifier means being respectively tuned to successive frequencies differing by a constant amount within the band swept by said beat frequency signals, a rectifier and peak signal detector connected to the outputs of said plurality of amplifier means, and means actuated by said rectifier and peak signal detector means for deriving therefrom a calibrating signals in response to an output from any one of said amplifier means.

2. Apparatus as set forth in claim 1, further including a device on which to record the calibration of said source driven in synchronism with said sweeping means, and means responsive to said calibrating signals for placing indications on different portions of said recording device.

3. Apparatus for calibrating the tuning means of a wave generator, comprising means providing a wave of constant reference frequency, means coupled to said generator for sweeping the frequency thereof through a band extending on either side of said reference frequency, a dial driven in synchronism with said sweeping means, means for heterodyning said reference frequency wave with the generator frequency wave to obtain a beat frequency wave swept through a second band, a plurality of circuits connected in parallel with the output of said heterodyning means, each of said circuits being tuned to a different frequency within said second band, means connected to said plurality of circuits for detecting the peak outputs of each of said circuits, and means coupled to said last-named means and responsive to said detected peak outputs for placing indications on different portions of said dial in response to different ones of said detected outputs.

References Cited in the file of this patent
UNITED STATES PATENTS

| | | |
|---|---|---|
| 2,275,977 | Means et al. | Mar. 10, 1942 |
| 2,476,445 | Lacy | July 19, 1949 |
| 2,492,062 | Potter | Dec. 20, 1949 |
| 2,629,829 | Daly | Feb. 24, 1953 |
| 2,704,805 | Byrne | Mar. 22, 1955 |